United States Patent [19]

Strong, Jr.

[11] Patent Number: 4,548,092

[45] Date of Patent: Oct. 22, 1985

[54] BICYCLE GEAR SHIFT UNIT

[76] Inventor: Samuel Z. Strong, Jr., R.R. 9, Box 58 Teresa, Columbia, Mo. 65202

[21] Appl. No.: 465,635

[22] Filed: Feb. 10, 1983

[51] Int. Cl.⁴ .................. B62K 23/02; B60K 20/06; B60K 41/26; G05G 5/08

[52] U.S. Cl. .................................. 74/475; 74/489; 74/551.8; 74/551.9

[58] Field of Search ............ 74/551.8, 551.9, 475, 74/489

[56] References Cited

U.S. PATENT DOCUMENTS

| | | | |
|---|---|---|---|
| 3,481,217 | 12/1969 | Maeda | 74/489 |
| 3,856,123 | 12/1974 | Kinsey | 192/3.62 |
| 4,100,820 | 7/1978 | Evett | 74/489 |
| 4,189,954 | 2/1980 | Nakamura et al. | 74/488 |
| 4,232,564 | 11/1980 | Yamasaki | 74/475 |
| 4,267,744 | 5/1981 | Yamasaki | 74/475 |
| 4,325,267 | 4/1982 | Kojima | 74/489 |
| 4,343,201 | 8/1982 | Shimano | 74/475 |

FOREIGN PATENT DOCUMENTS

| | | | |
|---|---|---|---|
| 1039864 | 11/1956 | Fed. Rep. of Germany | 74/551.9 |
| 2024381 | 1/1980 | United Kingdom | 74/475 |

Primary Examiner—Rodney H. Bonck
Assistant Examiner—Richard M. Lorence
Attorney, Agent, or Firm—Shoemaker and Mattare, Ltd.

[57] ABSTRACT

A bicycle gear shift unit permits a bicycle rider to effect a gear change without releasing the bicycle handlebars or brake handle. The shift unit includes a stationary base affixed to the handlebars and a rotatable base. A clutch mechanism allows the rider to return his hand to a selected position after changing gears.

13 Claims, 13 Drawing Figures

BICYCLE GEAR SHIFT UNIT

BACKGROUND OF THE INVENTION

The present invention relates in general to land vehicles, and, more particularly, to bicycles.

The gear changing operation in a typical multispeed bicycle requires the rider to remove his hand from the handle to operate the gear changing mechanism. This requirement induces an unsafe situation as some control of the bicycle is lost during such operation. Furthermore, when a cyclist is changing gears, he is not able to quickly operate a hand brake, and should an emergency arise, the situation is exacerbated by the requirement that the cyclist has his hand removed from the bicycle handlebars during a gear change.

Accordingly, there is need for a gear changing mechanism which permits simultaneous control of speed change and braking which also permits a cyclist to maintain both hands on the handlebars.

SUMMARY OF THE INVENTION

The device embodying the teachings of the present invention permits a cyclist to effect a change of gears without removing either of his hands from the handlebars, or from a brake handle.

The device includes a stationary base affixed to the handlebars and a rotatable base fixed to a handle which is grasped by the cyclist. The gear shift disc is coupled to the rotatable base, and a movable detent mechanism is interposed between the rotatable base and the stationary base. The detent mechanism produces audible clicks when the handle is rotated to indicate the gear changes are being effected and also assists in control of the overall unit.

In one embodiment of the device, means is included for permitting the cyclist to move his hand to another position after effecting a gear change without further change of gears. This embodiment includes a clutch mechanism to releasably couple the handle to the gear shift disc via an intermediate base, then to release that handle from that intermediate base after the gear change has been effected.

As above discussed, the device embodying the present invention enhances bicycle safety. Also, this device enhances bicycle efficiency as both the brake and the gear change mechanism can be operated simultaneously. Thus, a cyclist can downshift while braking if required, and then immediately be ready to start out in a low gear after stopping, or start accelerating again in a low gear.

The device also has means for adjusting the sensitivity of the gear changing mechanism from a configuration requiring great strength but short movements to effect a gear change, to a configuration requiring little strength but large movements to effect the same gear change.

The handlebar is also adjustable to provide for rider comfort depending upon riding conditions.

OBJECTS OF THE INVENTION

The main object of the present invention is to permit a bicycle rider to shift gears without moving his hands from a bicycle handgrip means.

Another object of the present invention is to permit a bicycle rider to shift gears without removing his hands from a bicycle handgrip means and to reposition his hands in a comfortable position after effecting a gear change.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
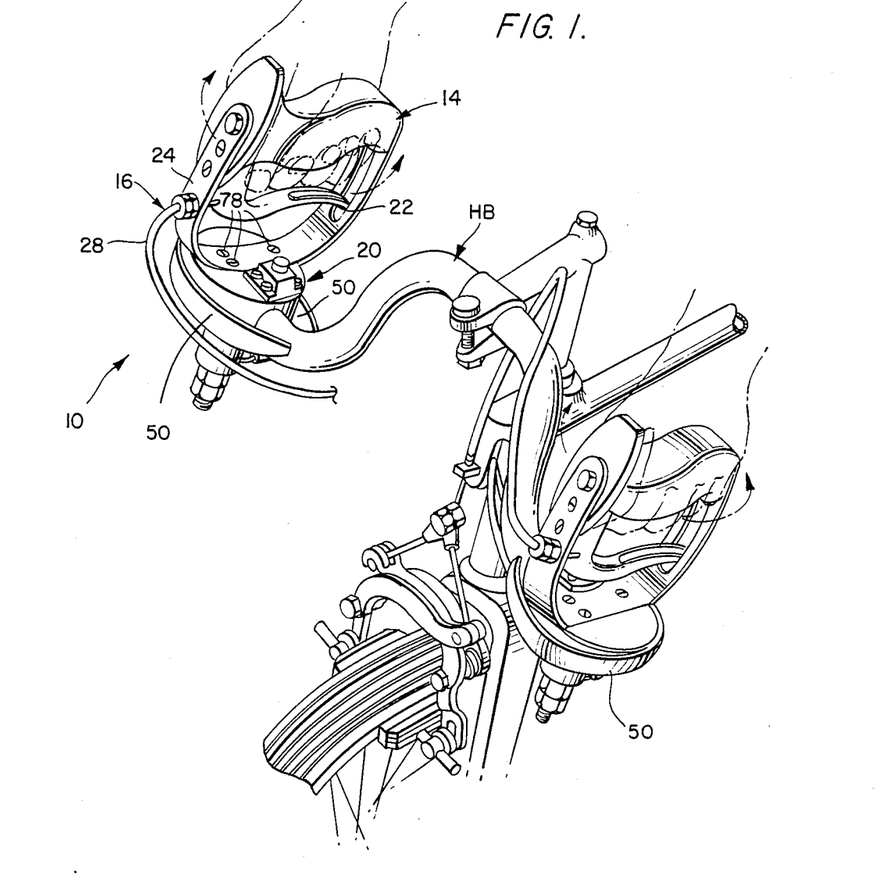
FIG. 1 is a perspective of a bicycle front end having mounted thereon a gear changing unit embodying the teachings of the present invention.

Shown in FIG. 1 is a hand unit 10 mounted on bicycle handlebars HB. The unit 10 includes a handgrip 14, a brake means 16 and a gear changing means 20.

The brake means 16 includes a hand operated brake lever 22 pivotably mounted on a yoke frame 24 and controlling a brake cable 26 positioned in a brake jacket 28. The brake lever operates brake units on the wheels of the bicycle in a known manner, and a grip jacket 30 mounted on the yoke permits a cyclist to comfortably hold onto the unit as shown in FIG. 1. The grip jacket can be molded in several sizes to accommodate various cyclists and be releasably mounted on the yoke.

Figures 3, 4:
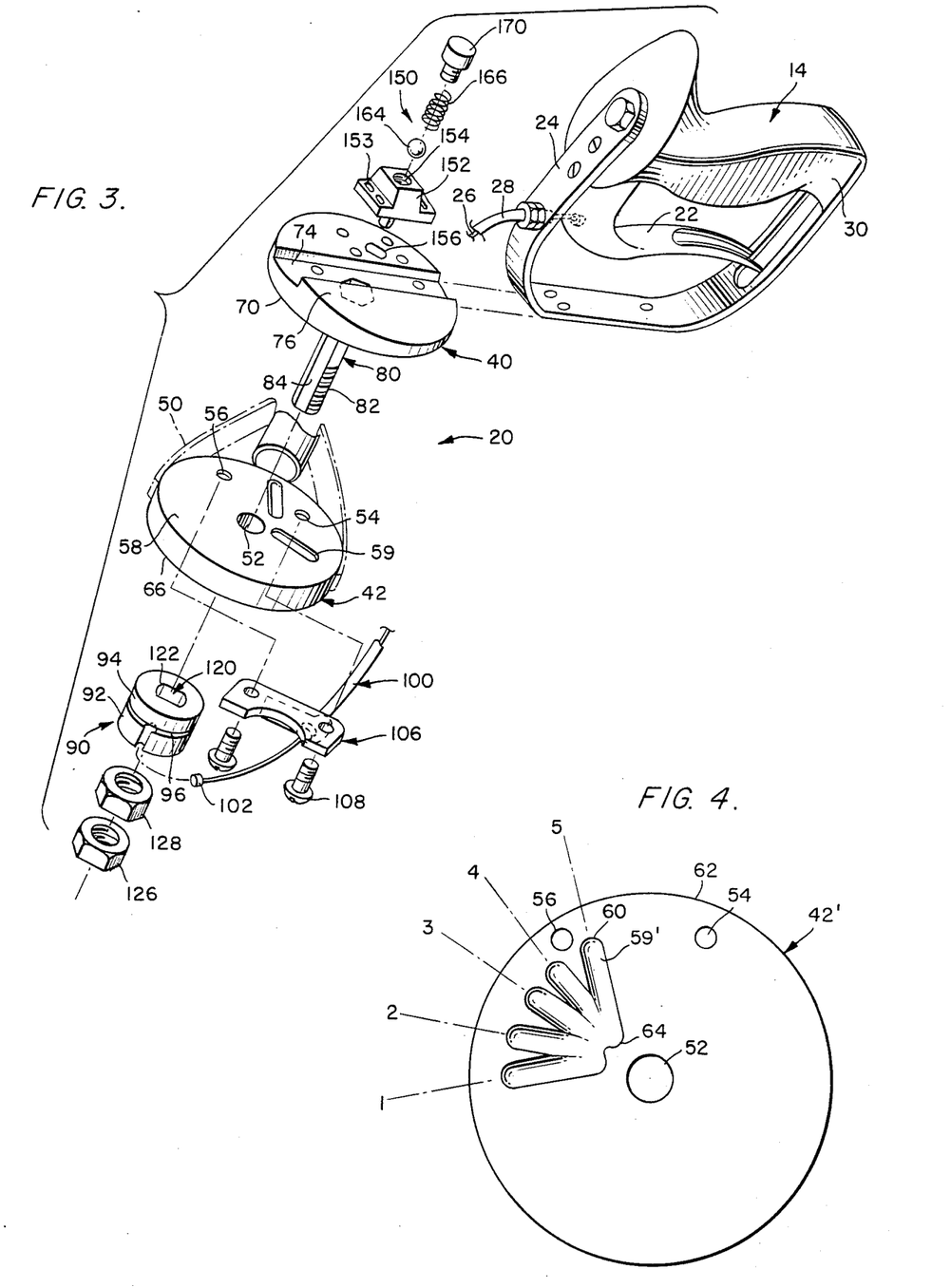
FIG. 3 is an exploded perspective of the gear changing unit embodying the teachings of the present invention.
FIG. 4 is a plan view of a stationary base of the gear changing unit embodying the teachings of the present invention with five slots thereon and which is used in conjunction with the two-slot unit shown in FIG. 3 to produce a ten-speed bicycle gear unit.

As best shown in FIG. 3, the gear changing means includes a rotatable base 40 and a stationary base 42 or 42'. The prime location is used to indicate that one stationary base contains two step changes, while the other stationary base contains five step changes, with the bases combining to produce a ten-speed unit. The rotatable and stationary bases are both circular in peripheral shape and have essentially equal outer diameters, and in the assembled configuration, the bases are coincident.

The stationary base is fixed to the handlebars by a stirrup frame 50 and is best shown in FIGS. 3 and 4. This base includes a central hole 52 and mounting holes such as holes 54 and 56, the purpose of which will be evident from the discussion presented hereinafter. A plurality of trough-like slots 59 or 59' are defined in upper surface 58 of the stationary base. The slots are elongate and prolate in shape with arcuate ends 60 located adjacent to the other perimeter 62 of the base and converging ends 64 located adjacent to the central hole 52. Each of the slots aligns with a center point located adjacent to but spaced from the center of the stationary base to allow proper gear selection adjustment. The slots are oriented and located according to gear changing considerations which will be evident to those skilled in the art from the teaching of this disclosure. For future reference, the stationary base also includes a lower surface 66.

The rotatable base 40 includes a lower surface 70 which is juxtaposed with the stationary base upper surface 58. An elongate slot 74 is defined in upper surface 76 to extend diametrically of that base. The slot is shaped and sized to snugly receive the yoke frame 24. Fasteners 78 attach the yoke to the rotatable base, or the frame can be molded to this base if suitable.

A bolt 80 is fixedly mounted to the base 40 to extend from rotatable base lower surface 70. The bolt is located centrally of the base to extend through stationary base central hole 52. The bolt 80 includes threads 82 and a pair of planar portions, such as flat 84.

As also shown in FIG. 3, the gear changing means includes a gear shift disc 90 which is cylindrical in peripheral shape with a cylindrical outer surface 92 having a keyhole 94 defined therein and a circumferential groove 96 extending circumambiently therearound and located adjacent to such keyhole. The gear unit includes a shift cable 100 having an eye 102 thereon. The eye 102 is received in the keyhole 94, and the cable is received in the groove 96. The cable is mounted on the stationary base by mounting bracket 106 and fasteners 108. The cable operates the derailleur gears of the unit. The disclosed embodiment uses pronation to shift gears via the gear cable. However, an opposite connection of the cable to the shift disc will use supination, if suitable.

A polygonal hole 120 is defined centrally of the shift disc and receives the bolt 80 with the flats 84 of that bolt engaging planar sides 122 of the shift disc hole so the shift disc is coupled to the rotatable disc to rotate therewith. The shift disc is held on the stationary base by a lock nut 126 and an adjusting nut 128 threadably attached to the bolt. The adjusting nut engages the stationary base lower surface and forces the rotatable base against the stationary base via the bolt 80 with a predetermined amount of pressure. This pressure is selected to permit relative rotation between the bases, but to prevent the derailleur return spring from rotating the unit. The lock nut maintains this adjustment.

As is also shown in FIG. 3, the unit 10 includes a detent mechanism 150 which includes a mount 152 fixed to the rotatable base upper surface by fasteners or the like extending through slots 153 and connecting to tapped bores in the rotatable base. The slots permit the mount to be moved on the rotatable base as necessary. The mount 152 includes an internally threaded bore 154 defined centrally therethrough and which is axially aligned with a slot or elongated hole 156 defined through the rotatable base. The slot 156 is located superjacent the slots 59 and 59' so that bore 154 is also located superjacent such slots.

The detent mechanism further includes a detent ball 164 located in bore 154 and slot 156 and a compression spring 166 biasing this ball towards the bases. A cap screw 170 is attached to the mount bore to capture the spring and ball in the bore 154.

Figure 2:
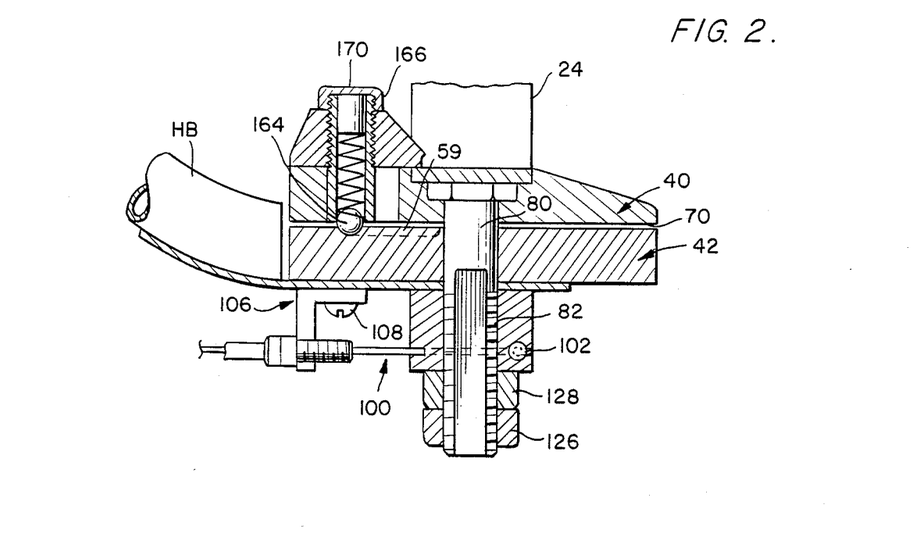
FIG. 2 is a cross-section showing the FIG. 1 gear changing unit.

The assembled unit is shown in FIG. 2, and attention is now directed to that figure. The detent ball 164 is biased into the slots 59 or 59', but can move from slot-to-slot by overcoming the bias of spring 166. The detent mechanism can be used to assist the lock nut in preventing the derailleur return spring from moving the bases. The slots thus serve as indexing means for the gear changing unit. Such movement results in audible clicks as the ball moves from slot-to-slot. As the handgrip is rotated, the gear cable is moved via the shift disc thereby changing the gears. At each stop, the ball is captured in a stop slot, and held therein by the spring 166. Each slot is located to effect an appropriate gear selection via the cable 100. Rotation of the handle is imparted to the shift disc via the bolt 80, and this rotation is relative to the stationary base so the ball 164 moves relative to that base and the slots defined therein.

The arrangement of the grooves in the stationary base and the detent ball/spring tube provide for the adjustment necessary for the difference in travel or swing of the different derailleurs presently on the market, and keep the rotational movement of the handle within the comfort range. The detent ball/spring tube has a base with slots to allow for adjustment with regard to degree of handle rotation. The detent ball/spring tube is off-center with regard to its base, so it can be turned around for additional adjustment. If the detent ball/spring tube is adjusted closer to the handle base pivot point, there is less degree of rotation of the handle, and as a result, there is less travel of the cable in relation to its jacket resulting in less movement of the derailleur. If the detent ball/spring tube is adjusted further away from the handle base pivot point, there is a greater degree of rotation of the handle, and as a result, there is a greater travel of the cable in its jacket resulting in greater movement of the derailleur. This allows for fine adjustment of the detent mechanism so that the derailleur and detent mechanism can be in proper relationship. The detent ball/spring tube has a threaded cap so that the spring tension on the ball can be relieved, making assembly and disassembly easier.

The base shown in FIG. 4 contains five slots 59' and the base shown in FIG. 3 contains two slots 59; however, other slots and numbers of slots can be used without departing from the scope of this disclosure. For example, the unit associated with the cyclist's right hand can control five step gears and the unit associated with his left hand can control two step gears on the pedal hub.

The slots can be located so that the extent of rotation required to activate the shift discs and derailleurs is within the comfort range of the average cyclist's fore arm/wrist movement, that of pronation and supination.

An alternative embodiment of the hand unit embodying the teaching of the present invention is shown in FIGS. 7–13, and is designated by reference indicator 200. The unit 200 permits a cyclist to change gears, then return his hand and arm to a comfortable position with respect to the handlebars while leaving the bicycle in the selected gear. The unit 200 includes a brake unit means 16, a handgrip 14, a shift disc 90 along with the associated adjusting nut 128 and lock nut 126. The shift disc is coupled to the rotatable base 40' by a bolt 80' which is similar to bolt 80. Further included with the unit 200 is a brake cable and gear cable as discussed above. A detent mechanism 150' includes a detent ball 164 and a biasing spring 166 and registers with slots 59 or 59' defined in the stationary base as above described during a gear changing operation as above described. The reason for the prime notation for the FIG. 7 detent mechanism will be presented below.

Figures 7, 8, 9, 10:
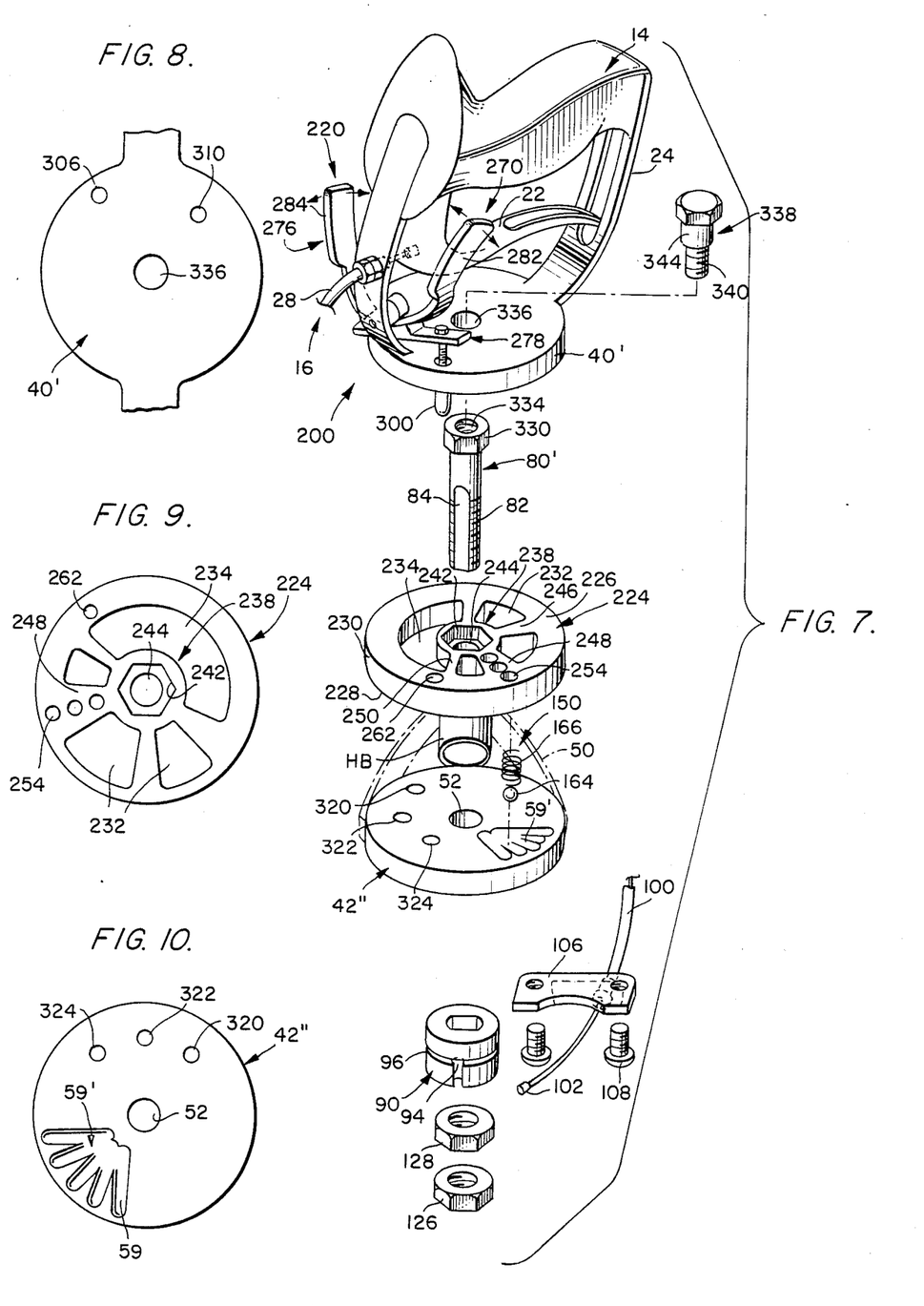
FIG. 7 is an exploded perspective showing another embodiment of the device embodying the teaching of the present invention.
FIG. 8 is a plan view of a rotatable base used in the FIG. 7 embodiment.
FIG. 9 is a plan view of an intermediate base used in the FIG. 7 embodiment.
FIG. 10 is a plan view of a stationary base used in the FIG. 7 embodiment.
Figure 11:
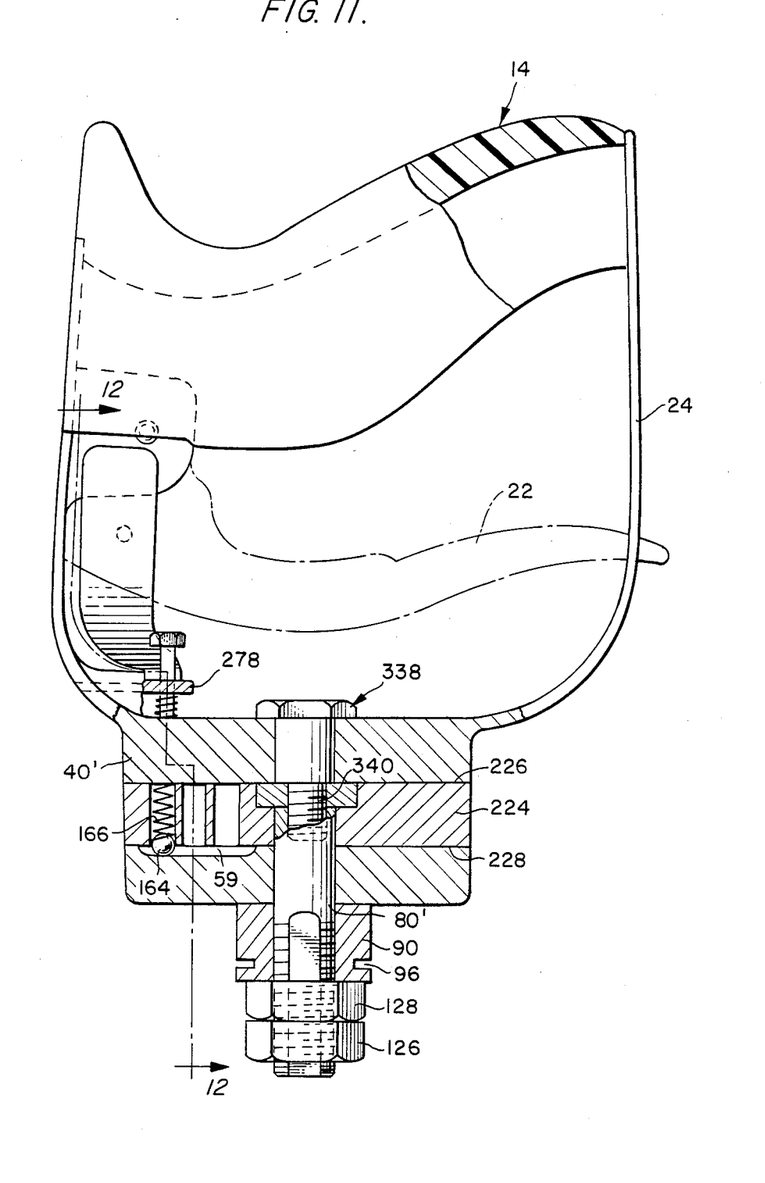
FIG. 11 is an elevation view of the FIG. 7 gear changing unit.

A stationary base 42" is fixedly mounted on the handlebars by a stirrup 50, as above-described, and a rotatable base 40' is fixed to the handle yoke frame 24 as above described. Alteratively, the stationary base could be molded to directly receive the handlebars.

The unit 200 includes a clutch mechanism 220 which permits the handle 14 to rotate the shift disc, and hence change the bicycle gears, then to be rotated with respect to the rest of the unit so a comfortable hand-arm position can be assumed after a gear changing operation has been effected.

The clutch mechanism includes an intermediate base 224 having an upper surface 226, a lower surface 228 and an outer peripheral surface 230. The intermediate base also has a plurality of cutouts 232 defined therein to reduce the weight of unit 200 and a lost motion slot 234 defined in the intermediate base about a central hub 238. A polygonal, preferably hexagonal, hole 242 is defined in the hub 238 and a central hole 244 forms a counterbore with the polygonal hole 242.

A plurality of spokes 246, 248 and 250 extend from the hub to the rim, and a plurality of detent accommodating bores, such as bore 254, are defined in the spoke 248 to be spaced apart radially on that spoke and to be located superjacent the gear changing slots defined in the stationary base as discussed with respect to unit 10. The detent bores accommodate the detent ball and spring as discussed above with respect to the detent bore 154. The detent ball and spring are located in an appropriate one of the bores according to the selectivity of gear changing movement required. As the bores are spaced apart radially, moving the detent ball and spring to an outer bore provides greater selectivity than when the ball and spring are in an inner bore, and must be moved farther to effect the same gear change via the shift disc and gear cable. However, the inner location does not require as much strength to move as does the outer location.

Figure 12:
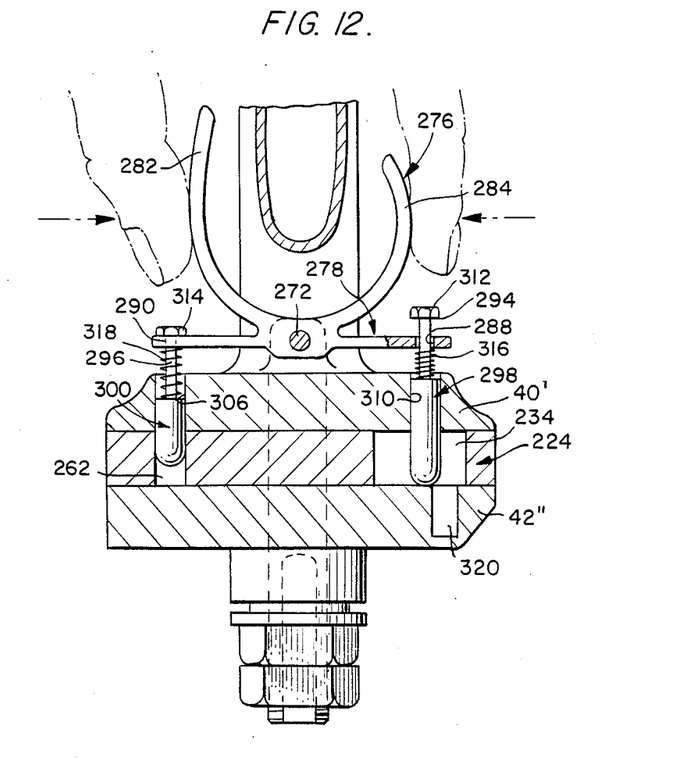
FIGS. 12 and 13 are elevation views of the FIG. 7 gear changing unit showing operation of the clutch mechanism of that unit.

A further hole 262 is defined through the intermediate base adjacent to the outer peripheral surface 230. This hole 262 is defined as an index finger pin hole. This hole is located as shown in FIGS. 7 and 12.

The clutch mechanism further includes release means comprising an operating mechanism 270 which is pivotally mounted on the yoke frame 24 by a pivot pin 272. The mechanism 270 includes a wishbone frame 276 and a lever arm 278 both of which are integral with each other. The frame 276 has a thumb side 282 and an index finger side 284 which can be respectively engaged by the thumb and index finger of a bicycle rider when that rider's hand is positioned on the unit handgrip 14. The lever includes a pair of holes 288 and 290 which respectively receive stems 294 and 296 of a thumb lock pin 298 and an index finger lock pin 300. It is noted that the lever is a first degree type lever and thus the index finger side of the wishbone frame is on the side opposite the index finger lock pin with respect to the pivot pin which serves as a fulcrum for the lever.

The rotatable base 40' has an index finger lock pin receiving hole 306 and a thumb lock pin receiving hole 310 defined therein. The stationary base 42" includes a plurality of thumb lock pin receiving holes 320, 322 and 324 located to receive the thumb lock pin the appropriate circumstances. The stems of the lock pins have threaded nuts 312 and 314 thereon to hold the pins in the latter holes, and springs 316 and 318 surround those stems to influence movement of the lock pins into and/or out of the corresponding holes.

The intermediate base is oriented with respect to the rotatable base so that the thumb pin 298 is accommodated the lost motion cutout 234 and the index finger lock pin 300 is accommodated in the hole 262 of the intermediate base.

The bolt 80' couples the intermediate base to the shift disc and includes a polygonal, preferably hexagonal, head 330 which is received in the polygonal bore 242 defined in the intermediate base hub. An internally threaded bore 334 is defined in the bolt 80' and axially aligned with a bore 336 defined centrally of the rotatable base 40'. A shoulder screw 338 couples the rotatable base to the bolt and includes a threaded shank 340 and a shoulder section 344. The shoulder screw couples the rotatable base to the intermediate base while permitting relative rotation between those two bases.

The bolt 80' includes flats 84 to couple that bolt to the shift disc and thereby couple the shift disc to the intermediate base so that rotation of the intermediate base produces corresponding rotation of the shift disc, and concomitant gear changes.

As is evident from the above, a gear change operation includes coupling the handgrip-rotatable base combination to the intermediate base via the index finger locking set, rotating the handle, and hence the shift disc, via the intermediate base and bolt 80', then decoupling the handle-rotatable base combination from the intermediate base by rocking the lever on 278 to withdraw the index finger lock pin from hole 262 on the intermediate base and returning the handle to a comfortable orientation. When the intermediate base rotates relative to the stationary base, the detent ball moves from one slot to the next as described above. At all times, before, during and after the gear changing operation, the bicyclist's hand remains on the handle, and hence the bicyclist remains in complete control of the bicycle and can brake at any time without moving his hand.

Figure 13:
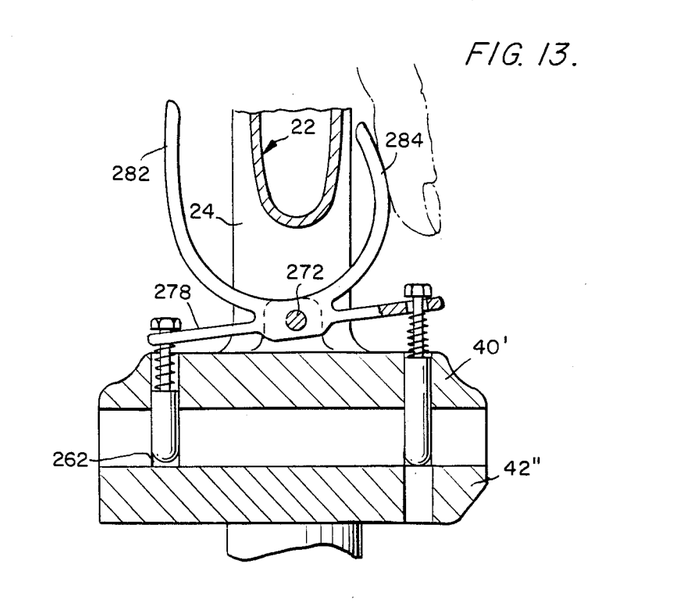

For the sake of completeness, a complete gear change procedure will now be described. Assuming the rider's hand is in the most comfortable orientation when that rider begins the operation, he first pushes the index finger side of the wishbone frame inwardly, thereby in effect compressing spring 318, and at the same time the thumb lock pin 298 is withdrawn from hole 320. This then allows unit 200 (rotatable base 40', handgrip 14 and brake unit 16) to be rotated by the rider until the index finger pin 300 is pushed into hole 262 by the compressed spring which locks unit 200 with the intermediate base, thereby coupling the handle to that intermediate base. This action also positions the thumb lock pin in the lost motion slot 234 of the intermediate base to move freely within that slot.

Once the handle is coupled to the intermediate base, and hence to the shift disc via the bolt 80', the handle is rotated. The detent mechanism is moved relative to the slots in the stationary base.

Once the appropriate gear is selected, the rotatable base is decoupled from the intermediate base by pressing the wishbone frame with the thumb, thereby locking the lever in the opposite direction and lifting the index finger lock pin out of the hole 262 in the intermediate base. The rotatable base is now free to rotate with respect to the intermediate base, which remains frictionally engaged with the stationary base due to the detent ball spring mechanism and the force created by the lock and adjusting nuts on the bolt 80' in the hub of the intermediate base.

The handle is then returned to a comfortable position, and as the handle is rotated, the thumb lock pin successively aligns with the thumb lock pin holes 320, 322 and 324 defined in the stationary base. The lock pin holes in the stationary base are located so that at no time can the position lock pins drop into a lock pin hole alternately while merely moving the lock lever back and forth. When the position lock lever is depressed one way, the handle must be rotated for the next hole to be aligned and a pin dropped into place. When a comfortable position is sought, the thumb side of the wishbone frame is pressed inwardly, thereby withdrawing lock pin 300 from hole 262 and compressing spring 316. The handle is now ready to be rotated to find a comfortable position. If lock pin 298 drops in an undesired hole, the wishbone frame is pivoted in the other direction by pushing inwardly on the index finger side to retract pin 298 so the handle can be rotated further. Once the handle is rotated so the pin will not drop in the undesired hole, the wishbone frame is pivoted immediately by pushing inwardly on the thumb side to compress spring 316 again and the handle is rotated further, thereby locking the rotatable base to the stationary base via the thumb pin extending through hole 310 in the rotatable base, lost motion slot 234 in the intermediate base, and hole 320-324 in the stationary base.

As above described, the rider was never required to remove his hand from the bicycle handle during the gear changing operation, and hence the cyclist remained in complete control of the bicycle and was also able to keep his hand on the brake handle at all times during the gear changing operation. Also, as above, two units 200 can be used to produce great variety in selection of gears.

The above description was intended to complete this disclosure, and is not intended as a limitation.

The bases and other elements of these units should be made of lighweight, yet strong, material and can be honeycombed or the like to decrease weight.

Figure 5:
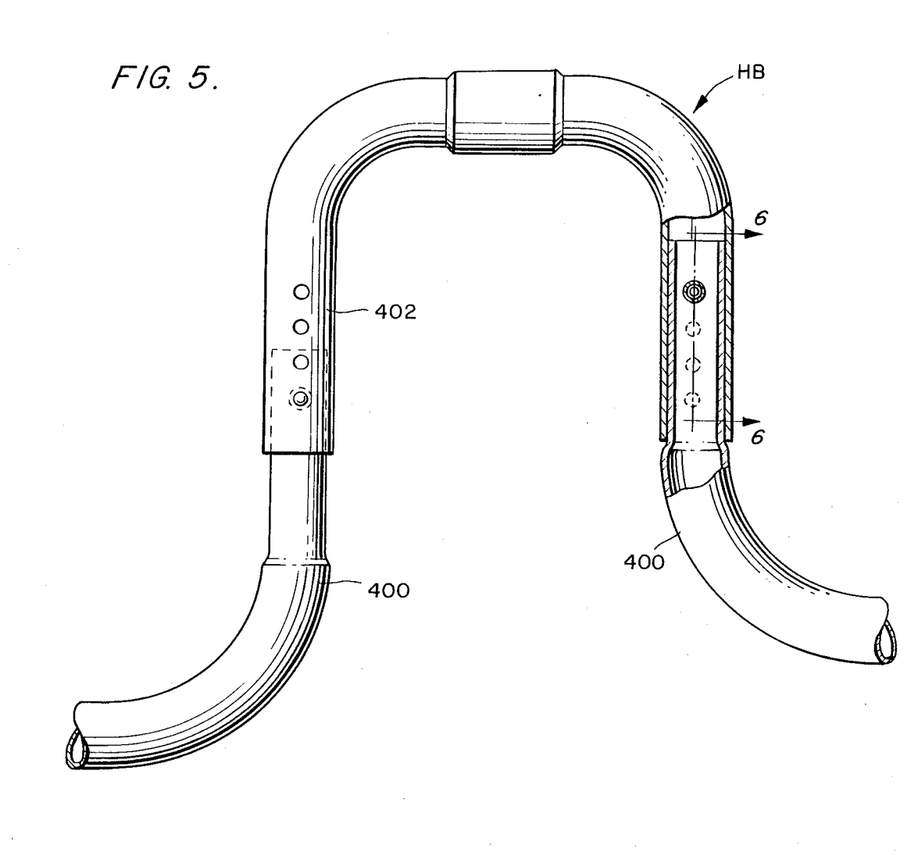
FIG. 5 is a plan view of an adjustable handlebar used in conjunction with the gear changing mechanism embodying the teachings of the present invention.
Figure 6:
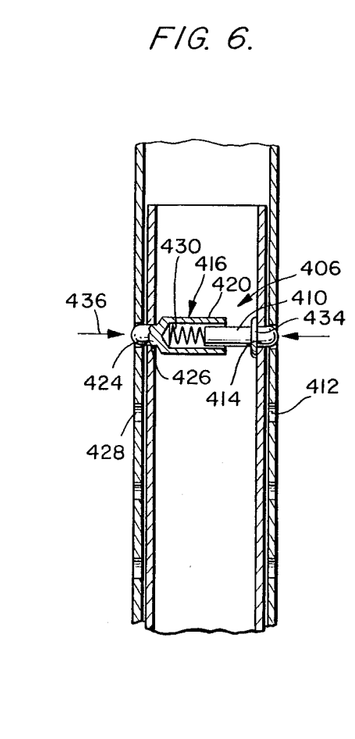
FIG. 6 is an elevation taken along line 6—6 of FIG. 5.

An adjustable handlebar is shown in FIGS. 5 and 6 and includes a pair of telescoping sections 400 and 402 held together by a snap catch mechanism 406. The catch includes a pin 410 which is received in holes 412 and 414 defined in the telescoping sections, and a pin biasing mechanism 416. The mechanism 416 includes a housing 420 having a stem 424 extending through holes 426 and 428 defined in the telescoping sections and a biasing spring 430 located within the housing and encircling the pin 410. A detent collar 434 prevents pin 410 from falling out.

Using the snap catch mechanism, by pressing inwardly on the snap catch 406 as indicated by arrows 436, a cyclist can orient and position the handlebars to alter his body position depending upon the type of riding desired, such as casual riding, or the like.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A gear changing mechanism for use on a bicycle comprising:
    a stationary base fixedly mounted on a handlebar of a bicycle, said stationary base having an upper surface with a plurality of indexing means defined therein and a bore defined therethrough;
    a rotatable base rotatably coupled to said stationary base, said rotatable base having a lower surface engaging said stationary base upper surface, and an upper surface;
    a handle fixed to said rotatable base upper surface for rotation therewith;
    a gear shift disc coupled by a gear shift cable to appropriate gears on the bicycle;
    a bolt attached to said rotatable base and extending through said stationary base bore into engagement with said gear shift disc to couple said disc to said rotatable base for rotation therewith;
    fastening means on said bolt for securing said gear shift disc to said bolt; and
    clutch means for disengaging said rotatable base from said shift disc.

2. The mechanism defined in claim 1 wherein said clutch means includes an intermediate base interposed between said rotatable and stationary bases, release means for detachably coupling said rotatable base to said intermediate base and for detachably coupling said rotatable base to said stationary base, said bolt coupling said intermediate base to said shift disc so said disc and said intermediate base rotate together.

3. The mechanism defined in claim 2 wherein said release means comprises an operating mechanism which includes a lever pivotally mounted on said handle, said lever having a thumb actuated leg and an index finger actuated leg, said operating mechanism further including a thumb lock pin attached to one end of said lever and an index finger lock pin attached to another end of said lever, said index finger lock pin being received in an index finger lock pin receiving hole defined in said intermediate base to couple said rotatable base to said intermediate base, with said thumb lock pin passing through a lost motion hole defined in said intermediate base and further being received in a first thumb lock pin receiving hole defined in said stationary base to couple said rotatable base to said stationary base, said lock pin receiving holes being located so that at no time can one of said lock pins be located in alternate lock pin receiving holes without rotating said rotatable base.

4. The mechanism defined in claim 3 further including a shoulder screw attaching said rotatable base to said intermediate base.

5. The mechanism defined in claim 3 further including a first detent mechanism bore defined through said intermediate base with a detent ball and spring being located in said detent mechanism bore.

6. The mechanism defined in claim 3 further including a second thumb lock pin receiving hole defined in said stationary base.

7. The mechanism defined in claim 3 wherein said bolt has a polygonal head and said intermediate base has a polygonal bore receiving said bolt head.

8. The mechanism defined in claim 3 further including a second detent mechanism bore.

9. The mechanism defined in claim 3 further including a biasing spring on each lock pin.

10. The mechanism defined in claim 1 wherein said indexing means includes a plurality of elongate troughs.

11. The mechanism defined in claim 1 further including brake actuating means mounted on said handle.

12. The mechanism defined in claim 1 wherein said bolt includes a planar portion and said shift disc includes a bore receiving said bolt, said bore having a planar portion engaging said bolt planar portion.

13. The mechanism defined in claim 12 wherein said fastening means includes an adjusting nut and a lock nut on said bolt.

* * * * *